Figure 2:
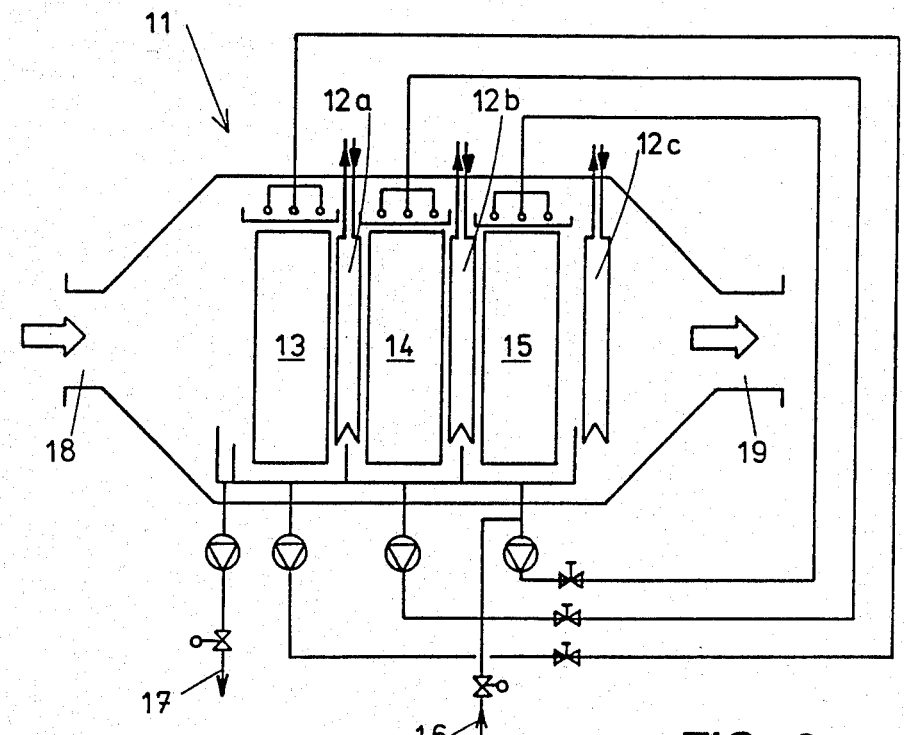

United States Patent [19]

Isaksson

[11] Patent Number: 4,827,711

[45] Date of Patent: May 9, 1989

[54] METHOD AND APPARATUS FOR RECOVERING HEAT FROM A GAS TURBINE

[75] Inventor: Matti J. Isaksson, Karhula, Finland

[73] Assignee: A. Ahlstrom Corporation, Karhula, Finland

[21] Appl. No.: 114,221

[22] Filed: Oct. 29, 1987

[30] Foreign Application Priority Data

Nov. 7, 1986 [FI]  Finland ................................. 864526

[51] Int. Cl.$^4$ ............................................... F02C 6/18
[52] U.S. Cl. ................................. 60/39.05; 60/39.07; 60/39.5; 60/39.55
[58] Field of Search ............... 60/39.05, 39.07, 39.181, 60/39.182, 39.5, 39.53, 39.55; 34/9, 27, 32, 74; 55/29–31

[56] References Cited

U.S. PATENT DOCUMENTS

| | | |
|---|---|---|
| 3,328,957 | 7/1967 | Rose .................................... 60/39.05 |
| 3,473,298 | 10/1969 | Berman ................................ 60/39.5 |
| 3,657,879 | 4/1972 | Eubank et al. ...................... 60/39.05 |
| 4,290,208 | 9/1981 | Hellman .................................. 34/27 |
| 4,329,788 | 5/1982 | Sterlini .................................... 34/27 |
| 4,458,500 | 7/1984 | Grossman . | |

Primary Examiner—Louis J. Casaregola
Attorney, Agent, or Firm—Nixon & Vanderhye

[57] ABSTRACT

In a gas turbine process in which hot moist gas produced by combusting natural gas and injecting steam to the combustion device, the relative moisture content of the gas is reduced after the turbine by adiabatic absorption by means of an absorbent liquid the only evaporating component of which is water. The condensation heat of the aqueous steam condensed in the absorption is to a large extent conveyed to the gas the temperature of which is thereby raised. The heat is recovered by known methods for use e.g. in district heating. The diluted absorbent liquid is regenerated for example by arranging it in the heat recovery stage before the absorption in indirect heat exchange contact with the gas.

17 Claims, 1 Drawing Sheet

U.S. Patent  May 9, 1989  4,827,711

METHOD AND APPARATUS FOR RECOVERING HEAT FROM A GAS TURBINE

The present invention relates to a method of recovering heat from a gas turbine process in which moist hot gas is supplied to the turbine.

A steam-injected gas turbine process has been introduced in the production of electricity as it facilitates reduction of $NO_x$ emissions and the capacity of the turbine can be improved.

The fuel of this process is normally natural gas (i.e. methane). The process is described more closely in the article "Steam-Injected Gas Turbines" by Larson, E. D. & Williams, R. H. published in the Journal of Engineering for Gas Turbines and Power, Transactions of the ASME 86-GT-47. A process of this kind in which natural gas is combusted and into which also steam is injected produces very moist flue gases.

Usually the temperature of the flue gases exhausted from a turbine is 350° to 700° C. This heat of the flue gas is generally used in the production of either low-pressure steam or for district heating. In the district heating application the final heat content is very low, e.g. 80° to 70° C. as there is no problem of acid condensation point in the combustion of natural gas.

The object of the present invention is to provide a method for recovering heat energy more efficiently than is possible with conventional methods.

According to the invention this is achieved by reducing the relative moisture content of the gas exhausted from the turbine by adiabatic absorption by means of absorbent liquid the only evaporating component of which is water whereby the condensation heat of the aqueous steam condensed in the absorption is to a large extent conveyed to the gas from which the heat is recovered by known methods.

U.S. Pat. No. 4,290,208 discloses a method of removing moisture from gas by adiabatic absorption by means of absorbent liquid such as sodium and/or potassium acetate the only evaporating component of which is water. This method is used in the process of the present invention. By arranging the moist gas to contact absorbent liquid the steam pressure of which is lower than the pressure of the gas the water content of the gas can be reduced. The absorbent liquid on the other hand absorbs water from the gas and is diluted. The diluted absorbent liquid is regenerated to the process. An energy volume corresponding to the condensation heat of the aqueous steam is conveyed to the gas which raises its temperature.

Figure 1:
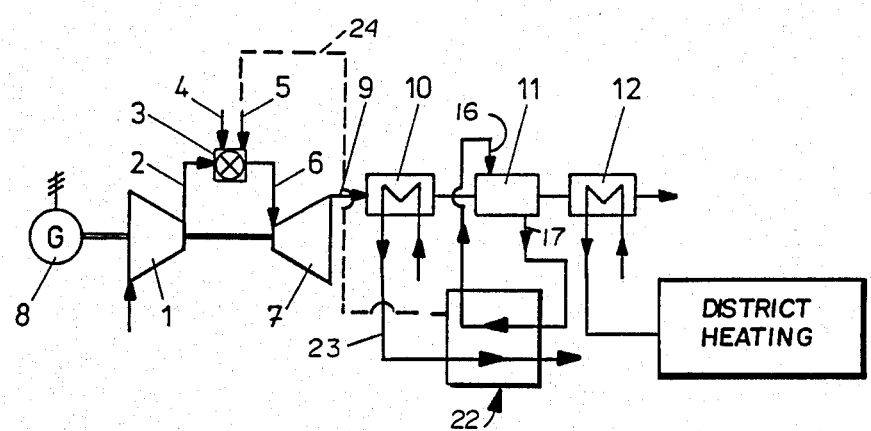

The invention is described more closely below with reference to the accompanying drawing in which FIG. 1 is a schematical illustration of a gas turbine process according to the invention; and FIG. 2 is a schematical illustration of an absorption apparatus applied in the process.

The reference numeral 1 in the system illustrated in FIG. 1 referes to an air compressor supplying pressurized air 2 in a combustion device 3 into which also fuel 4 such as natural gas or steam 5 is supplied. Moist and hot pressurized combustion gas 6 is introduced into the turbine 7 rotating an electric generator 8. Gas 9 discharged from the turbine at a decreased temperature and pressure is guided to a first heat recovery unit 10 in which the temperature of the gas is reduced e.g. from 650° to 80° C. From the first heat recovery unit the gas flows to an adiabatic absorption apparatus 11 in which moisture is removed from it and at the same time its temperature rises as the condensation heat of the aqueous steam is conveyed to it. Absorbent liquid is supplied via inlet 16, and diluted absorbent liquid flows out line 17. This is why heat can still be recovered from the gas after the absorption apparatus in a second heat recovery unit 12. The heat energy recovered in the first recovery unit 10 can be used e.g. for the regeneration of the absorbent liquid, for production of the injection steam or low pressure steam, or for district heating. For example, as illustrated in FIG. 1 diluted liquid in line 17 may pass to heat exchanger 22 so that the diluted liquid is passed in heat exchange relationship with the heated fluid in line 23 from first recovery unit 10. The steam generated in the condensation of the absorbent liquid can be recirculated to the combustor 3, as illustrated by line 24, in FIG. 1. The heat energy recovered in the second recovery unit 12 is most suitably used for district heating (see FIG. 1).

FIG. 2 illustrates more closely the absorption apparatus 11 and the second heat recovery unit 12 used in the method according to the invention.

In the embodiment example presented here, the absorption apparatus comprises three absorption stages 13, 14 and 15 provided with filler. The hot condensed absorbent liquid is pumped to the last stage 15 via duct 16 and it is discharged diluted from the first stage via duct 17. The diluted absorbent liquid is regenerated by a method know per se by evaporating for reuse, e.g. by arranging it in an indirect heat exchange contact with the discharge gases from the turbine during the heat recovery before the absorption stage. The gas is supplied to the apparatus via inlet duct 18 and is discharged from the other end of the apparatus via outlet 19. When travelling through the absorption apparatus, the gas is at first in contact with the dilute absorbent liquid in absorption stage 13 and ultimately with the condensed absorption liquid in stage 15. Part of the absorbent liquid which has passed through the absorption stage and has absorbed water and has thus increased in volume is recirculated to the same absorption stage and part flows to the next stage. The absolute moist content of the gas is reduced when it flows through the apparatus. After each absorption stage heat is recovered by arranging the gas to contact heat surfaces 12a, 12b and 12c provided in the absorption apparatus. The temperature of the gas rises when the gas flows through an absorption stage but due to the heat recovery has decreased again to the previous level before the next absorption stage.

EXAMPLE

The example is based on calculations with the following initial values:

air flow 2 157 kg/s steam injection 5 18.1 kg/s fuel flow 4 4.8 kg/s (methane)

temperature of flue gas before heat recovery unit 10 680° C.

temperature of flue gas after heat recovery unit 10 70° C.

The gas turbine sucks the moisture of the air at a rate of 470 g/s of moisture from 3 g/kg (which corresponds to $T_{outdoor} = 5°$ C.; moisture of 60%)

Further, moisture is generated in the combustion according to the reaction $CH_4 + O_4 \rightarrow 2H_2O$:

$$2 \times 4.8 \text{ kg/s} \times \frac{18(H_2O \text{ molar weight})}{16(CH_4 \text{ molar weight})} = 10.8 \text{ kg/s}$$

The moisture content of the flue gas is thus $$\omega = \frac{18.1 + 10.8 + 0.47 \text{ kg } H_2O}{157 \text{ kg dry air}}$$

$$\omega = 0.187 \text{ kg/kg}$$

If the moisture content of the flue gas after the absorption apparatus 11 is supposed to be 20% (relative moisture) the volume of water to be condensed and the condensation energy can be calculated at different temperature.

| T (°C.) | Supplied relative moisture (%) | Moisture cont. of gas, 20% relative moist. (kg/kg) | Volume water to be condensed (kg/s) | Condens. energy (MW) |
|---|---|---|---|---|
| 80 | 37 | 0.115 | 11.3 | 26.2 |
| 70 | 65 | 0.06 | 19.9 | 46.3 |
| 64 | 100 | 0.04 | 23.1 | 53.5 |

2320 kJ/kg was used as condensation heat

The electricity output in the nominal point of the gas turbine is in the example approx. 30 MW. By steam injection the output can be boosted to approx. 50 MW. Compared to these efficiencies the achievable heat efficiency increase is 50 to 100%.

The invention is not limited to the embodiment presented here as an example only but several modifications and applications of it are possible within the scope of protection defined by the appended patent claims.

We claim:

1. A method of recovering heat from moist hot gas discharged from a gas turbine, comprising the steps of: reducing the relative moisture of the gas discharged from the turbine by adiabatic absorption, including passing the hot moist gas into operative contact with an absorbent liquid which has water at its only vaporizing component, so that the condensation heat of the aqueous steam condensed by the adiabatic absorption is to a large extent conveyed to the gas from the turbine; and recovering heat from the gas after it is subjected to adiabatic absorption.

2. A method as recited in claim 1 wherein said reducing and recovering steps are practiced in a plurality of consecutive stages, with a recovery stage after each reducing stage.

3. A method as recited in claim 1 wherein the heat recovered in the recovery step is utilized in district heating.

4. A method as recited in claim 2 wherein said reducing and recovery steps are practiced in three stages.

5. A method as recited in claim 1 comprising the further step of recovering heat from the moist hot gas discharged from the turbine prior to the practice of said reducing step.

6. A method as recited in claim 5 wherein said reducing and recovering steps are practiced in a plurality of consecutive stages, with a recovery stage after each reducing stage.

7. A method as recited in claim 6 wherein said reducing and recovery steps are practiced in three stages.

8. A method as recited in claim 5 wherein the temperature of the hot moist gas at the start of the practice of the reducing step is approximately 80° C.

9. A method as recited in claim 8 wherein the temperature of the hot moist gas immediately after discharge from the turbine is approximately 650° C.

10. A method as recited in claim 1 wherein the temperature of the hot moist gas at the start of the practice of the reducing step is approximately 80° C.

11. A method as recited in claim 5 in which diluted absorbent liquid is produced by said reducing step, and comprising the further step of: regenerating the absorbent liquid by passing it in heat exchange relationship with heated fluid from the recovering step which is practiced prior to the reducing step.

12. A method as recited in claim 11 wherein during the regeneration of the absorbent liquid, steam is produced, and comprising the further step of feeding the produced steam to a combuster which produces the moist hot gas supplied to drive the turbine.

13. A gas turbine process and a method of recovering heat therefrom using a combuster, and a gas turbine, comprising the steps of:
 (a) supplying compressed air, fuel, and steam to the combuster to produce moist hot gas;
 (b) passing the moist hot gas through the gas turbine, with moist hot gas discharging from the gas turbine;
 (c) effecting a first recovery of heat from the hot moist gas discharged from the turbine;
 (d) after step (c), reducing the relative moisture of the moist hot gas by adiabatic absorption, including passing the gas into operative contact with absorbent liquid which has water as its only vaporizing component so that the heat of condensation of the aqueous steam in the moist gas condensed into the absorbent liquid is to a large extent conveyed to the gas; and
 (e) recovering heat from the gas after the practice of step (d).

14. A method as recited in claim 13 wherein steps (d) and (e) are practiced in a plurality of consecutive stages, with a recovery stage after each reducing stage.

15. A method as recited in claim 13 comprising the further step of: regenerating the diluted absorbent liquid from step (d) by passing it in heat exchange relationship with heated fluid from step (c).

16. A method as recited in claim 15 wherein during the regeneration of the absorbent liquid, steam is produced, and comprising the further step of feeding the produced steam to the combuster.

17. A gas turbine including heat recovery means, comprising:
 a turbine;
 means for supplying moist hot gas to said turbine; heat recovery means operatively connected to said turbine, said heat recovery means comprising:
 means for reducing the relative moisture of gas discharged from the turbine by adiabatic absorption, including passing the hot moist gas into operative contact with an absorbent liquid which has water as its only vaporizing component, so that the condensation heat of the aqueous steam condensed by the adiabatic absorption is to a large extent conveyed to the gas from the turbine; and means for recovering heat from the gas after it is subjected to adiabatic absorption.

* * * * *